United States Patent
Gan et al.

(10) Patent No.: US 8,208,191 B2
(45) Date of Patent: Jun. 26, 2012

(54) ULTRA-WIDE BAND SLOW LIGHT STRUCTURE USING PLASMONIC GRADED GRATING STRUCTURES

(75) Inventors: Qiaoqiang Gan, Bethlehem, PA (US); Zhan Fu, Houston, TX (US); Yujie J. Ding, Center Valley, PA (US); Filbert J. Bartoli, Center Valley, PA (US)

(73) Assignee: Leigh University, Bethlehem, PA (US)

( * ) Notice: Subject to any disclaimer, the term of this patent is extended or adjusted under 35 U.S.C. 154(b) by 283 days.

(21) Appl. No.: 12/609,478

(22) Filed: Oct. 30, 2009

(65) Prior Publication Data
US 2010/0110525 A1 May 6, 2010

Related U.S. Application Data

(60) Provisional application No. 61/109,549, filed on Oct. 30, 2008.

(51) Int. Cl.
G02F 1/01 (2006.01)
G02B 26/00 (2006.01)
G02B 26/08 (2006.01)

(52) U.S. Cl. ......... 359/288; 359/237; 359/290; 359/298
(58) Field of Classification Search ............. 359/298, 359/237, 290
See application file for complete search history.

(56) References Cited

U.S. PATENT DOCUMENTS

| | | | | |
|---|---|---|---|---|
| 5,157,537 | A * | 10/1992 | Rosenblatt | 359/245 |
| 7,184,629 | B2 | 2/2007 | Montgomery et al. | |
| 2004/0155309 | A1* | 8/2004 | Sorin et al. | 257/433 |
| 2005/0062973 | A1* | 3/2005 | Kim et al. | 356/445 |
| 2006/0050392 | A1* | 3/2006 | Schulz | 359/573 |
| 2006/0280407 | A1 | 12/2006 | Montgomery et al. | |

FOREIGN PATENT DOCUMENTS

| | | |
|---|---|---|
| CN | 11149289 A | 3/2008 |
| WO | WO03005086 A1 | 1/2003 |

OTHER PUBLICATIONS

Lene Vestergaard Hau, S. E. Harris, Zachary Dutton and Cyrus H. Behroozi, "Light Speed Reduction to 17 Metres Per Second in an Ultracold Atomic Gas," Nature, vol. 397, Feb. 18, 1999, www.nature.com, pp. 594-598.

Qiaoqiang Gan, Zhan Fu, Yujie J. Ding, and Filbert J. Bartoli, "Ultrawide-Bandwidth Slow-Light System Based on THz Plasmonic Graded Metallic Grating Structures," Physical Review Letters, week ending Jun. 27, 2008, 4 pages.

Zhan Fu. Qiaoqiang Gan, Yujie J. Ding, and Filbert J. Bartoli, "From Waveguiding to Spatial Localization of THz Waves Within a Plasmonic Metallic Grating," IEEE Journal of Selected Topics in Quantum Electronics, vol. 14, No. 2, Mar./Apr. 2008, pp. 486-490.

(Continued)

Primary Examiner — Dawayne A Pinkney
(74) Attorney, Agent, or Firm — Duane Morris LLP

(57) ABSTRACT

A slow light system includes a substrate and a metal layer formed thereon, the metal layer having a graded grating structure formed at a surface thereof, wherein the grating depth of the grating structure is sized such that surface-plasmon polariton dispersion behavior of the grating structure differs at different respective locations along the grating structure. Different wavelengths of incident light waves can be slowed at the respective locations along the grating structure.

20 Claims, 13 Drawing Sheets

OTHER PUBLICATIONS

Mehmet Fatih Yanki and Shanhui Fan, "Stopping Light All Optically," Physical Review Letters, vol. 92, No. 8, week ending Feb. 27, 2004, 4 pages.

Yurii A. Vlasov, Martin O'Boyle, Hendrik F. Hamann1 & Sharee J. McNab, "Active control of slow light on a chip with photonic crystal waveguides," Nature|vol. 438|Nov. 3, 2005, pp. 65-69.

Valentyn S. Volkov, Sergey I. Bozhevolnyi, Lars H. Frandsen, "Direct Observation of Surface Mode Excitation and Slow Light Coupling in Photonic Crystal Waveguides," Nano Lett., vol. 7, No. 8, 2007, pp. 2342-2345.

M. Notomi, K. Yamada, A. Shinya, J. Takahashi, C. Takahashi, and I. Yokohama, Extremely Large Group-Velocity Dispersion of Line-Defect Waveguides in Photonic Crystal Slabs, Physical Review Letters, vol. 87, No. 25, Dec. 17, 2001, 4 pages.

H. Gersen, T. J. Karle, R. J. P. Engelen, W. Bogaerts, J. P. Korterik, N. F. Van Hulst, T. F. Krauss, and L. Kuipers, "Real-Space Observation of Ultraslow Light in Photonic CrystalWaveguides," Physical Review Letters, week ending Feb. 25, 2005, 4 pages.

R.J.P. Engelen, Y. Sugimoto, Y. Watanabe, J.P. Korterik, N. Ikeda, N.F. Van Hulst, K. Asakawa, L. Kuipers, "The effect of higher-order dispersion on slow light propagation in photonic crystal waveguides," Feb. 20, 2006 / vol. 14, No. 4 / Optics Express 1658, 15 pages.

Takasumi Tanabe, Masaya Notomi, Eiichi Kuramochi, Akihiko Shinya and Hideaki Taniyama, "Trapping and delaying photons for one nanosecond in an ultrasmall high-Q photonic-crystal nanocavity," nature photonics |vol. 1 | Jan. 2007 | www.nature.com/naturephotonics, pp. 49-52.

Joe T. Mok, C. Martijn de Sterke, Ian C. M. Littler and Benjamin J. Eggleton, "Dispersionless slow light using gap solitons," nature physics vol. 2 Nov. 2006 www.nature.com/naturephysics, pp. 775-780.

Lene Vestergaard Hau, Optical information processing in Bose—Einstein condensates, nature photonics | vol. 2 | Aug. 2008 = www.nature.com/naturephotonics, pp. 451-453.

Luc Thévenaz, "Slow and fast light in optical fibres," nature photonics, vol. 2, Aug. 2008 |www.nature.com/naturephotonics, pp. 474-481.

A.V. Turukhin, V. S. Sudarshanam, and M. S. Shahriar, "Observation of Ultraslow and Stored Light Pulses in a Solid," Physical Review Letters, vol. 88, No. 2, Jan. 14, 2002, 4 pages.

Matthew S. Bigelow, Nick N. Lepeshkin, and Robert W. Boyd, "Observation of Ultraslow Light Propagation in a Ruby Crystal at Room Temperature," Physical Review Letters, vol. 90, No. 11, Mar. 21, 2003, 4 pages.

C. Genet & T. W. Ebbesen, "Light in tiny holes," Nature, vol. 445, Jan. 4, 2007, pp. 39-46.

Ekmel Ozbay, "Plasmonics: Merging Photonics and Electronics at Nanoscale Dimensions," www.sciencemag.org, Science vol. 311, Jan. 13, 2006, pp. 189-193.

William L. Barnes, Alain Dereux & Thomas W. Ebbesen, "Surface plasmon subwavelength optics," Nature | vol. 424 | Aug. 14, 2003, www.nature.com/naturephotonics, pp. 824-830.

Harry A. Atwater, "The Promise of Plasmonics," Scientific American, Apr. 2007, pp. 58-63.

M. Sandtke and L. Kuipers, "Slow guided surface plasmons at telecom frequencies," nature photonics | vol. 1 | Oct. 2007, www.nature.com/naturephotonics, pp. 573-576.

R. J. P. Engelen, D. Mori, T. Baba, and L. Kuipers, "Two Regimes of Slow-Light Losses Revealed by Adiabatic Reduction of Group Velocity," Physical Review Letters, PRL 101, 103901 (2008), week ending Sep. 5, 2008, 4 pages.

J. A. McCaulley, V. M. Donnelly, M. Vernon, and I. Tahat, Temperature dependence of the near-infrared refractive index of silicon, gallium arsenide, and indium phosphide, Physical Review B vol. 49, No. 11, Mar. 15, 1994-1, pp. 7408-7417.

K. L. Tsakmakidis, A. D. Boardman & O. Hess, "Can light be stopped in realistic metamaterials?" Nature| vol. 455|Oct. 23, 2008, pp. E10-E12.

Taskmakidis et al. reply to A. Reza, M. M. Dignam & S. Hughes, "Can light be stopped in realistic metamaterials?" Brief Communications Arising, Nature 455, Nature| vol. 455|Oct. 23, 2008, pp. E11-E12.

A. S. Vengurlekara, A. Venu Gopal and , T. Ishihara, "Femtosecond pulse distortion at surface plasmon resonances in a plasmonic crystal: Effect of surface plasmon lifetime," Applied Physics Letters 89, 181927, 2006, 3 pages.

A. Kasapi, Maneesh Jain, G. Y. Yin, and S. E. Harris, "Electromagnetically Induced Transparency: Propagation Dynamics," Physical Review Letters, vol. 74, No. 13, Mar. 27, 1995, pp. 2447-2451.

Qiaoqiang Gau, Yujie J. Ding, and and Filbert J. Bartoli, "Rainbow Traping and Releasing at Telecommunication Wavelengths," Physical Review Letters, PRL 102, OS6801, Feb. 6, 2009, 4 pages.

Chien Liu, Zachary Dutton, Cyrus H. Behroozi & Lene Vestergaard Hau, "Observation of coherent optical information storage in an atomic medium using halted light pulses," Letters to Nature, Nature |vol 409 | Jan. 25, 2001, pp. 490-493.

A. V. Turukhin et al., "Observation of Ultraslow and Stored Light Pulses in a Solid," Physical Review Letters, vol. 88, No. 2, Jan. 14, 2002, 4 pages.

Connie J. Chang-Hasnain, Fellow, IEEE, Pei-Cheng Ku, Student Member, IEEE, Jungho Kim, and Shun-Lien Chuang, "Variable Optical Buffer Using Slow Light in Semiconductor Nanostructures," Proceedings of the IEEE, vol. 91, No. 11, Nov. 2003, pp. 1884-1897.

Yoshihiso Yamamofo and Richarr E. Slusher, "Optical Processes in Microcavities," Physics Today Jun. 1993, pp. 66-73.

Mehmet Fatih Yanki and Shanhui Fan, Stopping Light All Optically, Physical Review Letters, vol. 92, No. 8, Feb. 27, 2004, 4 pages.

Fengnian Xia, Lidija Sekaric and Yurii Vlasov, "Ultracompact optical buffers on a silicon chip," Published online: Dec. 21, 2006, nature photonics |vol. 1 | Jan. 2007, pp. 65-71.

C. Genet1 & T. W. Ebbesen, "Light in tiny holes," Nature, vol. 445, Jan. 4, 2007, pp. 39-46.

J. B. Pendry, L. Martin-Moreno, F. J. Garcia-Vidal, "Mimicking Surface Plasmons with Structured Surfaces," www.sciencemag.org, Science vol. 305, Aug. 6, 2004, pp. 847-848.

Alastair P. Hibbins, Benjamin R. Evans, J. Roy Sambles, "Experimental Verification of Designer Surface Plasmons," Apr. 29, 2005, vol. 308, Science, www.sciencemag.org, pp. 670-672.

Michael B. Johnston, "Superfocusing of terahertz waves," nature photonics, vol. 1, Jan. 2007, www.nature.com/naturephotonics, pp. 14-15.

Stefan A. Maiera et al., "Terahertz pulse propagation using plasmon-polariton-like surface modes on structured conductive surfaces," Applied Physics Letters 88, 251120, 2006, 3 pages.

Stefan A. Maier, Steve R. Andrews, L. Marti'N-Moreno, and F. J. Garcia-Vidal, "Terahertz Surface Plasmon-Polariton Propagation and Focusing on Periodically Corrugated Metal Wires," PRL 97, 176805 (2006), week ending Oct. 27, 2006, 4 pages.

Kosmas L. Tsakmakidis, Allan D. Boardman & Ortwin Hess, "Trapped rainbow' storage of lignt in metamaterials," Nature, vol. 450, Nov. 15, 2007, pp. 397-401.

L. Zhao and S. F. Yelin, "'Trapped Rainbow' in Graphene," ITAMP, Harvard-Smithsonian Center for Astrophysics, Cambridge, Massachusetts 02138, (Dated: Dec. 15, 2008), pp. 1-11.

F. J. Garcia-Vidal, L. Martin-Moreno and J. B. Pendry, "Surfaces with holes in them: new plasmonic metamaterials," Journal of Optics A: Pure and Applied Optics 7 (2005) S97-S101, pp. S97-S101.

Zhichao Ruan and Min Qui, "Slow electromagnetic wave guided in subwavelength region along one-dimensional periodically structured metal surface," Applied Physics Letters 90, 20190, 2007, 3 pages.

Sahin Kaya Ozdemir, Member, IEEE, and Gonul Turhan-Sayan, Member, IEEE, "Temperature Effects on Surface Plasmon Resonance: Design Considerations for an Optical Temperature Sensor," Journal of Lightwave Technology, vol. 21, No. 3, Mar. 2003, pp. 805-814.

Jose A. Sanchez-Gil and Jaime Gómez Rivas, "Thermal switching of the scattering coefficients of terahertz surface plasmon polaritons impinging on a finite array of subwavelength grooves on semiconductor surfaces," Physical Review B 73, 205410, 2006, 8 pages.

Tineke Thio, K. M. Pellerin, R. A. Linke, H. J. Lezec and T. W. Ebbesen, "Enhanced light transmission through a single subwavelength aperture," Dec. 15, 2001 / vol. 26, No. 24 / Optics Letters, pp. 1972-1974.

Qiaoqiang Gan, Zhan Fu, Yujie J. Ding, and Filbert J. Bartoli, "Bidirectional subwavelength slit splitter for THz surface plasmons," Dec. 24, 2007 / vol. 15, No. 26 / Optics Express 18050, 6 pages.

Franco Nori, "The dynamics of spinning light," Nature Photonics, vol. 2, Dec. 2008, www.nature.com/naturephotonics, pp. 716-717.

"New metallic grate may help integrate optical structures with electronic devices at nano-scale," Article from The Hindustan Times; Article dated Jun. 28, 2008; http://www.highbeam.com/DocPrint.aspx?DocId=1P3:1501962811; HighBeam™ Research, a part of The Gale Group, Inc. ® Copyright 2009.

"IBM Scientists Harness 'Slow Light' for Optical Communications," http://www.physorg.com/news7839.html, Nov. 3, 2005, 10 pages.

"IBM Researchers Develop World's Tiniest Nanophotonic Switch," article from The Wireless News, article dated Mar. 24, 2008, http://www.highbeam.com/DocPrint.aspx?DocId=1P1:150734541, HigBeam™ Research, a part of The Gale Group, Inc. © Copyright 2009, 2 pages.

Michael Kanellos, IBM slows light, readies it for networking, Posted on ZDNet News: Nov. 2, 2005, http://news.zdnet.com/2100-9584_22-145405.html, 6 pages.

Rita Boland, "When Faster Isn't Better," article from Signal dated Jun. 1, 2008, http://www.highbeam.com/DocPrint.aspx?DocId=1P3:1501930201, HighBeam™ Research, a part of The Gale Group, Inc. © Copyright 2009, 3 pages.

Rick Weiss, "Researchers slow light while maintaining its abilitty to carry information.(Dispatches)," article from The Sunday Independent (South Africa); Article date:Jan. 28, 2007, http://www.highbeam.com/DocPrint.aspx?DocId=1G1:158529264, HighBeam™ Research, a part of The Gale Group, Inc. © Copyright 2009, 2 pages.

Yuriia.Vlasov, et al., "Active control of slow light on a chip with photonics crystal wave guides," Nature Letters, vol. 438, Nov. 3, 2005, pp. 65-69.

"Creating Faster Integrated Circuits by Slowing Light," UCSD Jacbos School of Engineering, http://www.jacobsschool.ucsd.edu/news/news_releases/release.sfe?id=732, Apr. 22, 2008, 3 pages.

Toshihiko Baba, et al., "Large delay-bandwidth product and tuning of slow light pulse in photonic crystal coupled waveguide," Jun. 9, 2008 / vol. 16, No. 12 / Optics Express 9245, 9 pages.

M. Sandtke and L. Kuipers, "Slow guided surface plasmons at telecom frequencies," nature photonics, vol. 1, Oct. 2007, www.nature.com/naturephotonics, pp. 573-576, N. Lethomas et al., "Grating-assisted super resolution of slow waves in Fourier space," Physical Review B76, 035103, 2007, 5 pages.

Kosmas L. Tsakmakidis et al., "Trapped rainbow storage of light in meta materials," Nature Letters, vol. 450, Nov. 15, 2007, 5 pages.

"All-Optical Variable Buffer with Gain," UCDavis InnovationAccess, http://www.innovationaccess.ucdavis.edu/ncd.cfm?ncdid=934, Last updated on Mar 4, 2008, 2 pages.

* cited by examiner

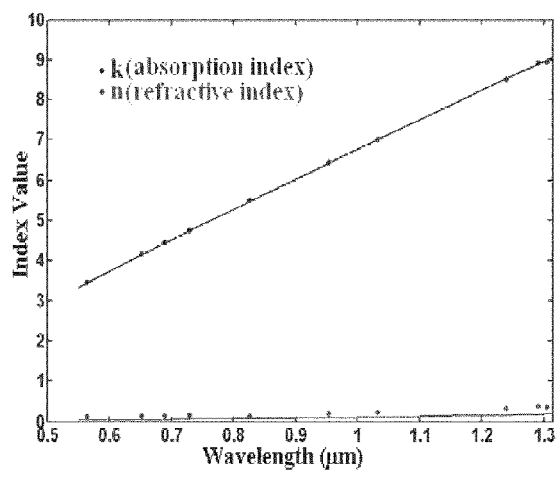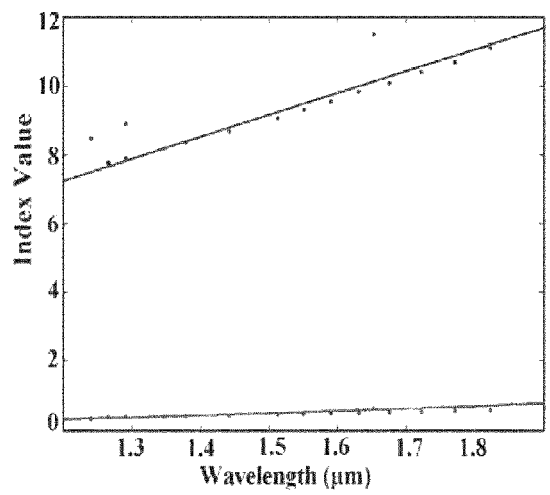
FIG. 5A  FIG. 5B

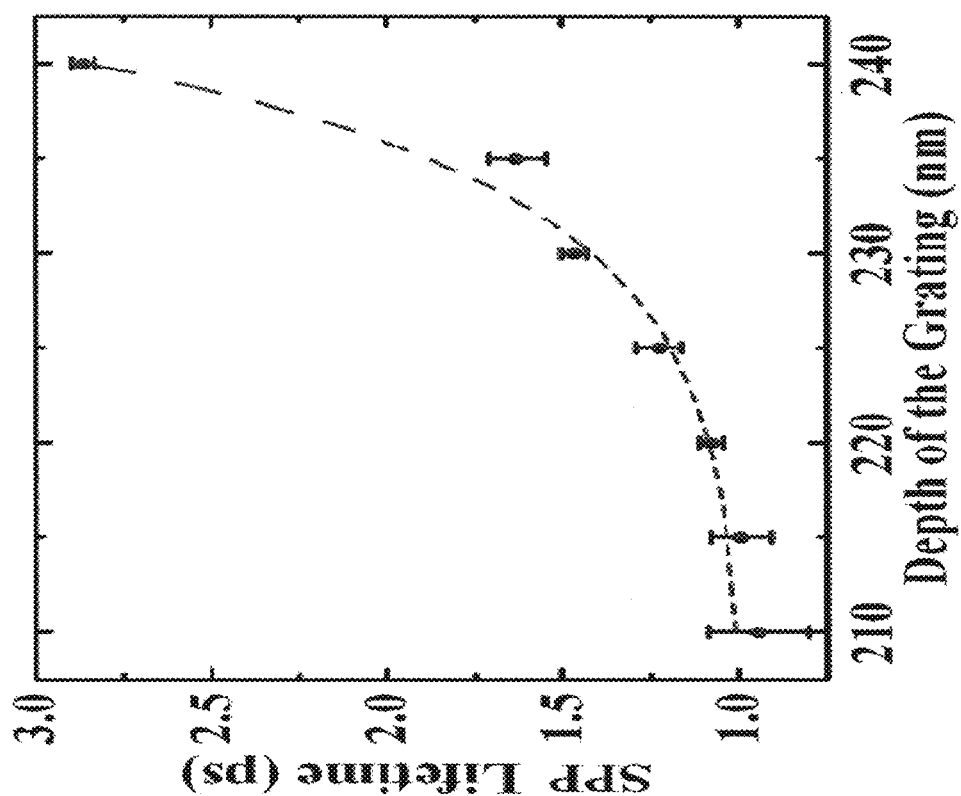
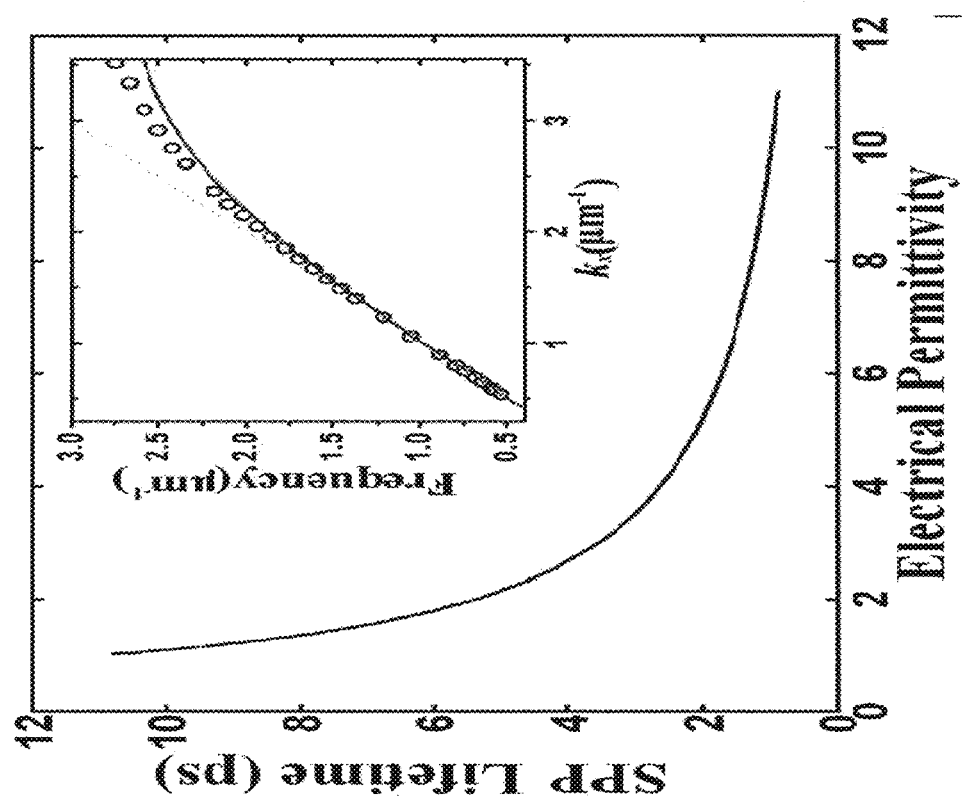
FIG. 10B
FIG. 10A

ULTRA-WIDE BAND SLOW LIGHT STRUCTURE USING PLASMONIC GRADED GRATING STRUCTURES

CROSS-REFERENCE TO RELATED APPLICATIONS

This application claims priority to U.S. Provisional Patent Application No. 61/109,549 entitled "'Rainbow' Trapping and Releasing For Surface Waves: An Ultra-Wide Band Slow Light Structure", filed Oct. 30, 2008, the entirety of which is hereby incorporated by reference herein.

GOVERNMENT LICENSE RIGHTS

The U.S. Government has a paid-up license in this invention and the right in limited circumstances to require the patent owner to license others on reasonable terms as provided for by the terms of Grant # CBET-0608742 awarded by the National Science Foundation.

FIELD OF THE INVENTION

The present invention relates to apparatuses for the control of light, and more specifically to structures for slowing incident light.

BACKGROUND OF THE INVENTION

It is known that light can be slowed down in the vicinity of resonances in dispersive materials. In order to reduce the group velocity ($v_g$) of light coherently, there are two major approaches employing either electronic or optical resonances. In the electronic scheme, drastic slowing down and complete stopping of light pulses can be accomplished by converting optical signals into electronic coherences. The use of electronic states to coherently store the optical information, however, imposes severe constraints in the scheme, including narrow bandwidth, limited working wavelengths and strong temperature dependence.

While promising steps have been taken towards slowing light in solid-state media and semiconductor nanostructures operating at room temperature, "stopping" light completely and implementation of slow light structures on a chip including optoelectronic devices remains a great challenge. As a result of these obstacles, there has been great interest in pursuing alternative approaches utilizing optical resonances in photonic structures, such as microcavities, photonic crystals, and semiconductor waveguide ring resonators.

Recently, it was proposed that plasmonic structures and devices operating in the optical domain offer advantages for applications such as on-chip integration of optical circuits, surface or interface technology, and data storage. What makes the plasmonic structure unique is its potential for spatial confinement of electromagnetic energy within sub-wavelength dimensions over a wide spectral range.

Despite some advances in this field, there remains a need for an ultra-wide bandwidth slow-light system.

SUMMARY OF THE INVENTION

A slow light system includes a substrate and a metal layer formed thereon, the metal layer having a graded grating structure formed at a surface thereof, wherein the grating depth of the grating structure is sized such that surface-plasmon polariton dispersion behavior of the grating structure differs at different respective locations along the grating structure. Different wavelengths of incident light waves can be slowed at the respective locations along the grating structure.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which:

FIGS. 5A and 5B show data representing the optical properties of silver in visible to near infrared domain and in the telecommunication domain, respectively.

FIG. 10A shows the calculated SPP mode lifetime for a given incident wavelength, with an inset showing the calculated dispersion curve for a flat silver/air interface;

FIG. 10B shows an estimate of SPP lifetime along a grating surface for various depths;

DETAILED DESCRIPTION

Figure 1:
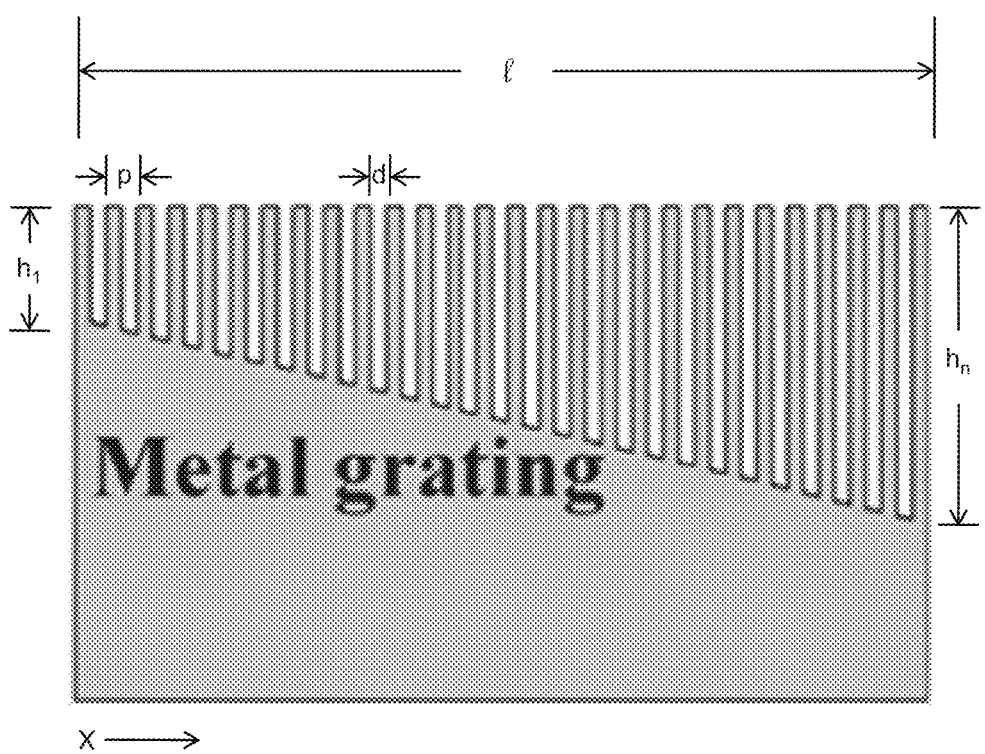
FIG. 1 is a side view of a graded metal grating structure according to an embodiment of the present invention.

This description of the exemplary embodiments is intended to be read in connection with the accompanying drawings, which are to be considered part of the entire written description. In the description, relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

As used herein, "surface plasmons" (also referred to in the literature as "surface plasma polaritons" or "SPPs") are fluctuations in the electron density at the boundary of two materials. Plasmons are the collective vibrations of an electron gas (or plasma) surrounding the atomic lattice sites of a metal. The surface plasmon polariton propagates along the surface of the metal until it decays, either by absorption, whereupon the energy is converted into phonons, or by a radiative transition into a photon. A metal surface can be patterned with grooves or holes that have a characteristic dimension that is less than the wavelength of the incident radiation, the electromagnetic boundary conditions of the incident radiation can be altered to strongly localize the radiation to the surface of the metal in the form of a "spoof" or "designer" surface plasmon.

In embodiments of a slow light system described herein, a structure is presented for slowing down (i.e., reduce or stop) THz waves on a metallic grating structures with graded depths, whose dispersion curves and cutoff frequencies are different at different locations. Since the group velocity of "spoof" surface plasmons at the cutoff frequency is extremely low, THz waves are actually stopped at different positions for different frequencies. The separation between stopped waves can be tuned by changing the grade of the grating depths. This structure offers the advantage of reducing the speed of the light over an ultra-wide spectral band, and the ability to operate at various temperatures.

In embodiments, by incorporating the frequency-dependent dielectric properties of the metal, the graded grating structures developed for the aforementioned "trapped rainbow" storage of THz light in the μm level can be scaled to the nm level for telecommunication waves for applications in optical communications and various nanophotonic circuits.

Slow-Light System for THz Waves:

FIG. 1 is a side view of a metal film having a graded metallic grating of varying depth. The grating can be formed from continuous grooves in the metal film. As can be seen from FIG. 1, the height of the gratings (or depth of the troughs therebetween) gradually increase in the x-direction across the metal film. The grating structure can be fully defined by it length "l" is the x-direction, the heights $h_1$ and $h_n$ of the first and last gratings, respectively, the period "p" of the grating structure, and the separation "d" between the gratings.

As discussed in more detail below, a small (gradual) gradient in the graded grating structure is used to help couple the SPP modes from one depth to the next deeper depth. If the depth difference is large, the scatter loss and reflection loss will be large when the SPP mode propagates from one groove to the next deeper groove. Choosing a small gradient help to reduce this loss. In various simulations discussed herein, the gradient (Δh/Δx) was set to be between approximately 1/80 to 1/100.

Figure 2:
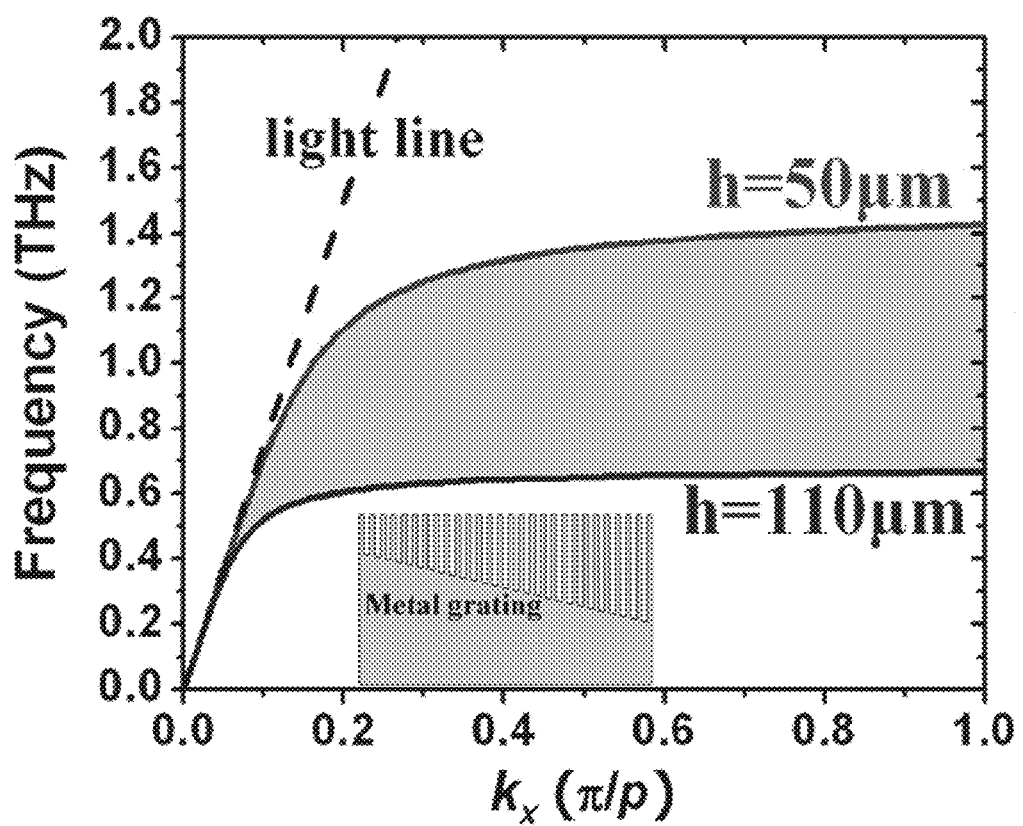
FIG. 2 shows the dispersion curves for different groove depths for a metal grating structure for THz wavelengths.

As shown in FIG. 2, the slow-light properties of surface-plasmon polariton (SPP) modes can be studied by introducing just beneath the surface of a metal film a metal grating as shown in FIG. 1. Compared to traditional (non-graded) approaches, the grating structure of FIG. 1 offers the ability to reduce the speed of the light over a wide-bandwidth and the ability to work at ambient temperatures. The grating structure is capable of stopping light of different frequencies at different locations on a chip. The separation between the adjacent waves stopped by this structure can be tuned freely by changing the grade of the grating depths.

The THz domain can be used to illustrate the spoof SPP theory and to show the long-wavelength SPP dispersion behavior and slow-light characteristics associated with the grating structure. For simplicity, the dispersion curves of a metallic surface with a constant grating depth, which consists of a one-dimensional (1D) groove array engraved in the metal surface, with a depth h, width d, and lattice constant p, are first analyzed. A 1D groove would be a good approximation of a fabricated slit on a metal film where the length of the slit/groove is much larger than its width (e.g., 20 μm length and a width of 100 nm).

In most of the theoretical studies for the metallic structures based on SPPs in the THz and GHz domains, as an approximation the metals can be treated as perfect electrical conductors (PEC). This assumption has been made for purposes of this discussion.

The dispersion relation for TM-polarized ($E_x$, $E_z$, and $H_y$) electromagnetic waves propagating in the x direction can be obtained to a first-order approximation:

$$k_x = \frac{\omega}{c} \sqrt{\frac{d^2}{p^2} \tan^2\left(\frac{\omega}{c} h\right) + 1} \quad \text{(Eq. 1)}$$

where c is the light velocity in vacuum and w is the frequency of the light. The dispersion relations for the 1D groove arrays with various parameters (h, d, p) can be obtained by solving Eq. (1). FIG. 2 illustrates the solutions obtained for d=20 μm and p=50 μm, and h=50 μm and 110 μm. Note, it is not necessary to make d=p/2. Rather, the dispersion curve can be tuned by changing d and p separately. One can see from FIG. 2 that for h=50 μm the cutoff frequency of the dispersion curve is close to 1.4 THz. Therefore, the corresponding structure is capable of supporting the surface electromagnetic modes at the grating surface at such a frequency. This was verified by finite-difference-time-domain (FDTD) simulations. For h=110 μm, the cutoff frequency for the grating structure is reduced to about 0.6 THz. Therefore, the electromagnetic wave at 0.6 THz could be coupled into the grating structure and confined at its surface. It is worth noting that Eq. (1) is an approximate expression. According to FDTD simulation results, the cutoff frequency estimated from Eq. (1) is slightly larger than stated above. By introducing an eigenvalue equation in the corrugated conducting plane of a periodic system and taking higher-order scattering components into account, the numerical value of the cutoff frequency is in a perfect agreement with the FDTD simulations. Therefore, it is convenient to use the approximate expression to illustrate the principle of the grating structure design for slowing down the electromagnetic waves. The dashed "light line" in FIG. 2 demonstrates the relationship between $k_x$ and frequency for a free space propagating light, which is very different from a confined spoof SPPP modes.

As illustrated by the ω-$k_x$ relations in FIG. 2, the surface structures are capable of slowing down the electromagnetic waves since the group velocity ($v_g$) (i.e., the slope of the tangent line of the dispersion curve at a given point) of the SPP modes are lower than that for the free space electromagnetic wave. If an electromagnetic wave incident at a frequency slightly below the cutoff value is coupled into SPP modes, its $v_g$ approaches zero. In this case, the 1D periodic structure with a sub-wavelength period (i.e., "p" is less than the wavelength of the incident light) functions as a waveguide for supporting slowly propagating electromagnetic modes. However, such a metallic surface with a constant grating depth only works as a slow-light device for a very narrow range of frequencies near the cutoff value.

Next, consider a graded grating as shown in FIG. 1, where the depth of the grating is now graded linearly from the left-hand side to the right-hand side. In such a case, the dispersion curves of the graded grating depths will differ from those for a structure with a constant grating depth. For example, considering that the depths h of the grating in the left-hand side and the right-hand side are 50 and 110 μm, respectively, the dispersion curves between the two ends now lie in the shaded region between the two lines in FIG. 2. When the depth changes from 50 to 110 μm, the cutoff frequency of the grating structure now increases from 0.6 to 1.4 THz.

The $v_g$ for the surface waves may be derived from Eq. (1) and expressed as:

$$v_g = \frac{d\omega}{dk_x} = \frac{c}{A + \frac{2d^2 h\omega}{p^2 cA} \tan\left(\frac{\omega}{c}h\right)\sec^2\left(\frac{\omega}{c}h\right)} \quad \text{(Eq. 2)}$$

where A equals:

$$A = \sqrt{\frac{d^2}{p^2}\tan^2\left(\frac{\omega}{c}h\right) + 1}.$$

From Eq. 2, the group index for the SPP modes can be calculated to be:

$$\frac{c}{v_g} = \frac{c}{d\omega/dk_x} = A + \frac{2d^2 h\omega}{p^2 cA}\tan\left(\frac{\omega}{c}h\right)\sec^2\left(\frac{\omega}{c}h\right).$$

The reciprocal of the $v_g$ of the SPP modes is calculated according to the dispersion curves in the gray region in FIG. 2. One can see from FIG. 3 that the $v_g$ at the frequencies of 0.9, 0.8, 0.7, and 0.6 THz (shown from left to right in the curves of FIG. 3) are reduced significantly from the speed of light in vacuum. If the grading of these grating depths (i.e., Δh from one grating to the next) is sufficiently small, the $v_g$ at these four frequencies can be reduced to zero. This implies that the electromagnetic waves are completely "stopped" at the different locations along the surface grating, depending on the frequencies of the incoming electromagnetic waves. A broadband electromagnetic wave within a frequency band of 0.6-1.4 THz can be dramatically slowed down in a single graded-grating-depth structure as shown in FIG. 1, illustrating the ultra-wide-band capability of this approach. This structure has clear advantages compared with approaches based on the cold or warm atomic gases or semiconductor nano structures and devices.

Only when the grating depth whose cutoff frequency corresponds to the incident light frequency is reached can the SPP modes be stopped. Otherwise, they will be scattered or reflected back when the next grating cannot support them. That is, a grating can support surface waves whose frequencies are lower than the cutoff frequency. Any wave higher than the cutoff frequency cannot be supported by this grating. Suppose a frequency is stopped at a grating with a fixed depth. For the next grating, the depth is deeper. The cutoff frequency of that frequency is lower than the frequency of this incident wave. The deeper grating will not support this surface wave.

Figure 3:
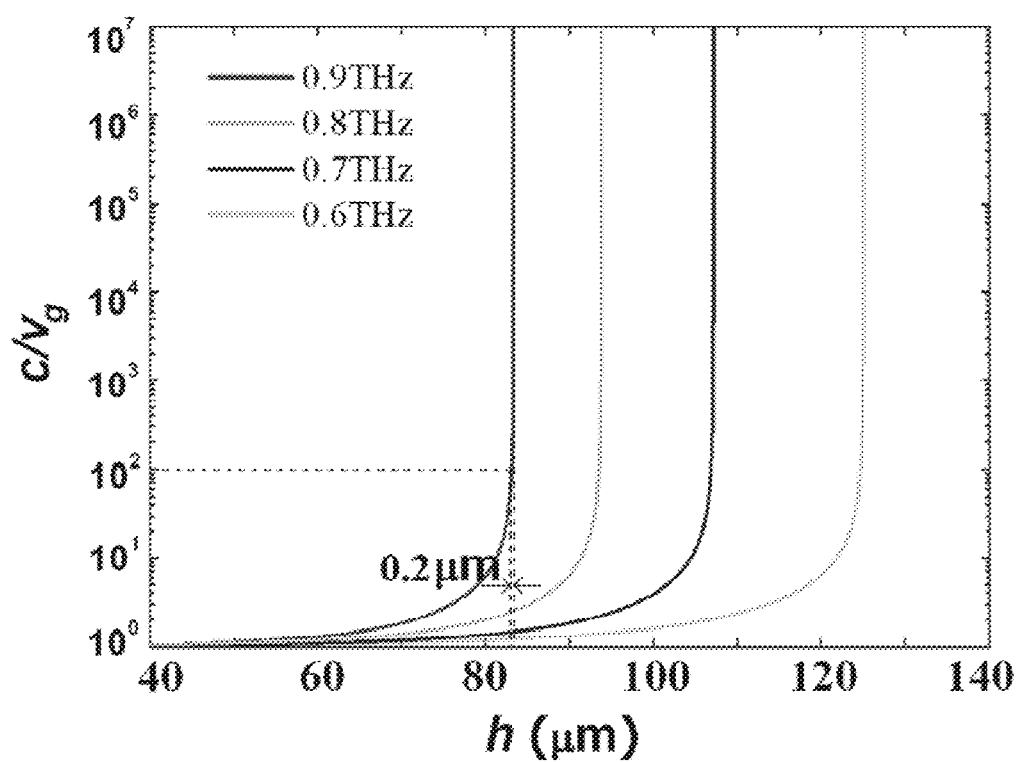
FIG. 3 group velocities of various wavelengths of light in THz domain at different groove depths in a metal grating structure.

The effects of temperature on the properties of SPP modes have been studied for metal films in the visible to near infrared spectrum and for doped semiconductor surface structures in the THz spectrum. Temperature-dependent effects reported in these studies arose primarily from the temperature dependence of the dielectric properties of, for example, the doped semiconductor structures. However, at THz frequencies, metals can be treated as perfect electrical conductors, and the SPP modes for these grating structures are not expected to be as sensitive to temperature-dependent dielectric properties. Therefore, the disclosed slow-light structure should be capable of operating over a wide range of temperatures in the THz spectrum, unlike any counterparts based on atomic gases. It should be noted that the slow-light structure still requires great thermal stability because a small change of the working temperature will introduce thermal expansion or contraction of the structure. As shown in FIG. 3, the dispersion curve and the $v_g$ of the SPP modes are sensitive to the depth of the gratings. A depth change about 0.2 μm will cause the $v_g$ to change from $c/10^7$ to $c/10^2$ at 0.9 THz (as shown by the line of 0.9 THz in FIG. 3). Because of the thermal expansion of the metal materials, a temperature shift will change the structure parameters and therefore dramatically affect the $v_g$ of the SPP modes.

By way of example, the thermal expansion expression of silver can be expressed by Eq. (3):

$$\frac{\Delta L}{L_0} = \left(\begin{array}{c} -0.515 + 0.1647 \times 10^{-3}T + \\ 3.739 \times 10^{-7}T^2 + 6.283 \times 10^{-11}T^3 \end{array}\right)\%. \quad \text{(Eq. 3)}$$

Here, $L_0$ is the length or lattice parameter at room temperature, which is about 292.335 K. Assuming that the structure parameters are p=50 μm, d=20 μm, and h=83.335 μm at 292.335 K, the $v_g$ of the SPP modes at 0.9 THz is about $10^{-5}$·c [according to Eq. (2)]. When the working temperature shifts by ±10 K, the structure parameters will be p=50.009 μm, d=20.004 μm, and h=83.351 μm at 302.335 K, and p=49:991 μm, d=19.996 μm, h=83.319 μm at 282.335 K because of thermal expansion, and the $v_g$ will be about c/1229 and c/1506, respectively. Such a dependence can be used to fine-tune the group velocity by varying the temperature.

It is worth noting that the different frequencies are localized at various positions corresponding to different grating depths as shown in FIG. 3. For instance, the electromagnetic wave at the frequency of 0.9 THz is almost stopped at the location having the depth of approximately 83.335 μm, whereas the electromagnetic wave at 0.6 THz is localized at the grating depth of 125.000 μm. The process of slowing down or stopping light was simulated using a two-dimensional (2D) FDTD model. The thickness of the metal layer that formed the grating structure was assumed to be 400 μm, and the frequency of the incident wave to be within 0.6-0.9 THz. The period and width of the grating structure are 50 and 20 μm, respectively.

Figure 4:
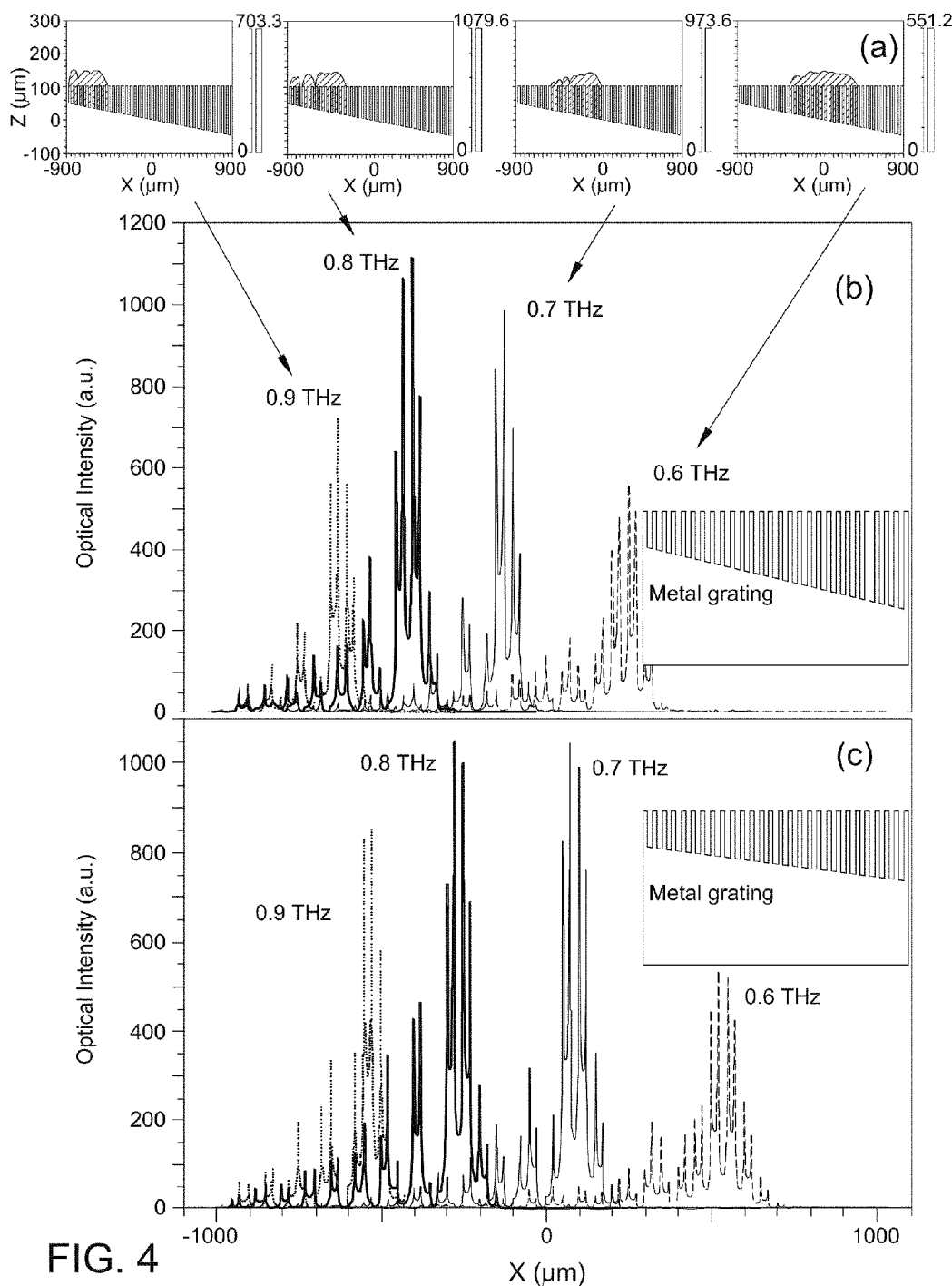
FIG. 4 show the results of a 2D FDTD simulation at four different frequencies in THz domain for a graded metal grating structure.

FIG. 4 shows the results obtained from the 2D FDTD simulations. Section (a) of FIG. 3 shows the 2D field distribution at four different frequencies of (from left to right) 0.9, 0.8, 0.7, and 0.6 THz. Sections (b) and (c) of FIG. 4 represent 1D optical intensity ($|E|^2$) distribution at 2 μm above the structured metal surface. With the period and width of the grating structure set at 50 and 20 μm, respectively, the depth of the grating structure in (b) and (c) changes from 50 to 150 μm linearly [the inset in (b)] and from 50 to 130 μm linearly [the inset in (c)] from the leftside end to the right-side end, respectively. The dimension of the numerically simulated region is 3600 μm×800 μm with a uniform cell of Δx=2 μm and Δz=2 μm. This simulated region is surrounded by a perfectly matched layer absorber. The total length of the grating structure is approximately 2 mm ($t_{pass}$=2 mm/c), and the calculation time is set to T=7.5$t_{pass}$=15 mm/c. An electromagnetic wave propagating in free-space should be able to propagate from the left-hand side to the right-hand side of the simulation region within the calculation time.

The 2D FDTD simulation results show that different frequencies within the range of 0.6-0.9 THz are localized at different locations along the surface after a calculation time, T1=7.5$t_{pass}$. When the calculation time is longer, e.g., T2=15$t_{pass}$, 50$t_{pass}$, and 100$t_{pass}$ the locations of these frequencies more or less stay unchanged (data not shown in FIG. 4), confirming that the $v_g$ of the SPP modes have been reduced drastically. These characteristics are also reflected in the 1D steady-state wave intensity at a location of 2 μm above the metal surface (section (b) of FIG. 4). These results clearly show that the graded grating depths can be used to slow down the electromagnetic wave packet and even stop it at different locations on the surface depending on the frequency of the incoming electromagnetic wave. It should be noted that it was observed that every peak amplitude of the electric field in sections (b) and (c) of FIG. 4 is located right at each edge of the grating ridge. In other words, for the modes guided by the graded grating structure the electromagnetic fields are most intense at the edges of the ridges. Such a structure could be used to disperse different frequency components of the incoming electromagnetic wave, i.e., to function as a spectrometer. If the surface grating structure is incorporated into a chip, the wavelength or frequency of the electromagnetic wave can be readily analyzed by monitoring the localized evanescent waves. A plasmonic wavelength-division multiplexer is provided by coupling out different waves at different locations. Interestingly, if the grade of the grating depths is changed, the separations between the adjacent waves can be tuned freely. For example, if the depth of the grating structure changes linearly from 50 to 130 μm from left to right across the structure, the peak locations of the different frequencies will be expanded horizontally [as shown in section (c) of FIG. 4.

The micrometer-scale dimensions of the grating structure for THz waves can be easily realized by current fabrication technologies, such as established photolithography and etch techniques employed by the integrated circuit fabrication industry. In one embodiment, the grating structure is formed using focused ion beam milling.

The issue of coupling the free space light to be SPP mode is an important issue with the use of SPPs. Some coupling approaches have been reported which may be helpful for coupling enhancement on a single side (i.e., without symmetric structure on top of the grating) grating structures, such as a tapered waveguide as reported in Q. Gan, Z. Fu, Y Ding and F. Bartoli, "Bidirectional Subwavelength Slit Splitter for THz Surface Plasmons", Opt. Express 15, 18050 (2007) or perpendicular razor blade as reported in S. Maier and S. Andres, "Terahertz Pulse Propagation Using Plasmon-Polariton-Like Surface Modes on Structured Conductive Surfaces Appl. Phys. Lett. 88, 251120 (2006), the entirety of each of which are hereby incorporated by reference herein.

Per the foregoing description, a metal surface structure with graded grating depths is provided that supports THz SPP modes. When the grating depths are graded, the dispersion curves of the surface structure are spatially inhomogeneous. Such a graded-grating-depth structure is capable of slowing down or even stopping electromagnetic waves within an ultrawide spectral band at different locations along the surface. The separation between the adjacent localized frequencies can be tuned freely by changing the grade (i.e., Δh of adjacent gratings) of the grating depths. Importantly, the propagation characteristics of these spoof SPP modes can be controlled by the surface geometry (e.g., by the period, width and/or depth of the grooves). Such a feature can be used for the control of the electromagnetic wave on-a-chip or even as a spectrometer integrated on a chip for chemical and biological diagnostics, spectroscopy and signal processing applications. Compared to traditional slow-light proposals, this structure offers the advantages of slowing down and stopping the electromagnetic waves over an ultrawide spectral band and the ability to operate at various temperatures.

Slow-Light System for Telecommunication Wavelengths:

By incorporating the frequency-dependent dielectric properties of the metal, the graded grating structures described above for "trapped rainbow" storage of THz light at the μm wavelength level can be scaled to the nm level for telecommunication waves for applications in optical communication and various nanophotonic circuits.

As described above, graded metallic grating structures are capable of slowing light to a standstill at different locations. Some advantages of these structures include the ability to reduce the speed of the light over a wide range of wavelengths and temperatures, including at room temperature. Since plasmonic structures and devices operating in the optical domain offer significant advantages for merging photonics and electronics within nanoscale dimensions, it is of value to incorporate the dispersion properties of the metal and scale the operating frequencies of these structures from THz domain to the telecommunication domain, or even to the visible domain to trap light visible to the human eye.

Scaling laws show how the cutoff frequency in the dispersion relations of periodic gratings can be easily scaled to other frequency regimes. The feature size of the metal gratings can be decreased to nanoscale dimensions to extend operational frequencies to the visible and infrared domains. In embodiments, the metal grating structure is formed from silver. Using the complex refractive indices of the selected metal, e.g., silver, the dispersion relations of the gratings can be simulated by FDTD simulations. In the two-dimensional FDTD simulation model, the dispersion property of silver is described by a simple Drude model:

$$\varepsilon(\omega) = \varepsilon_{inf} + \frac{d}{-\omega^2 - ib\omega}. \quad \text{(Eq. 4)}$$

The results are shown in FIGS. 5A and 5B. The solid lines were obtained by fitting optical data to the Drude expression above, using the three adjustable numerical parameters for this Drude fitting model, $\varepsilon_{inf}$, d and b. These figures show the experimental optical properties for silver, where n is the refractive index (dots in the upper curve of each figure) and k is the absorption index (dots in the lower curve of each figure). The real part of permittivity is given by $\varepsilon'=n^2-k^2$, and the imaginary part is given by $\varepsilon''=2nk$. FIG. 5A illustrates fitted data for optical properties of silver in the visible to near infrared domain ($\varepsilon_{inf}$=4.134, d=1977 and b=0.06255). FIG. 5B shows fitted data for optical properties of silver in the telecommunication domain ($\varepsilon_{inf}$=4.000, d=1561 and b=0.1371). These parameters, which were input directly into the material setting dialog in the Rsoft, Fullwave model software, are normalized using b'=bπc, and d'=dc², where c is the speed of light.

Figure 6:
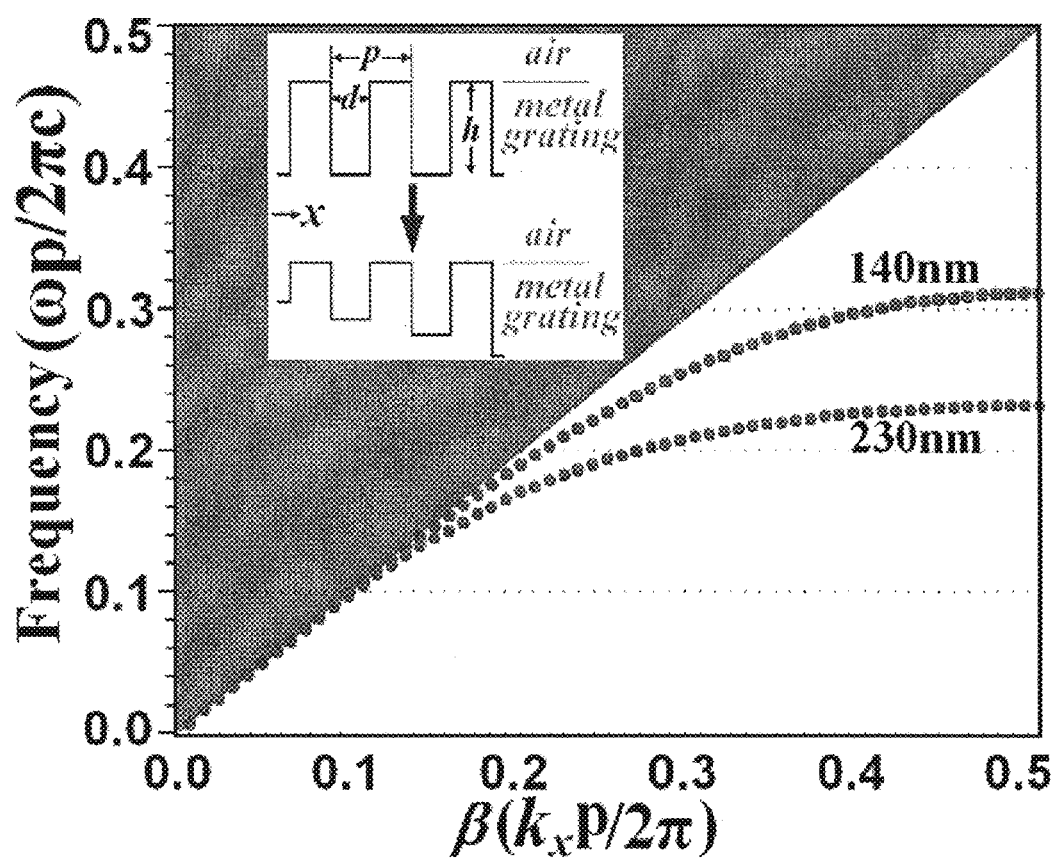
FIG. 6 shows the dispersion curves for different groove depths for a metal grating structure configured for the telecommunication domain.

Like FIG. 2, FIG. 6 shows calculated dispersion curves. The inset to FIG. 6 shows a schematic of grating structures with a constant depth and a grating structure with a graded depth. In this figure, the x axis is the reduced propagation constant with a unit of $k_x p/2\pi$. The y axis is the reduced frequency with a unit of $\omega p/2\pi c$, where c is the light velocity in vacuum. As can be seen from FIG. 6, the cutoff frequencies of the silver gratings with structure 1 (h=230 nm, d=200 nm, p=400 nm) and structure 2 (h=140 nm, d=200 nm, p=400 nm) are both in the telecommunication domain: $1.7808\times10^{14}$ Hz ($\lambda$=1.6846 µm) for structure 1 and $2.26637\times10^{14}$ Hz ($\lambda$=1.3237 µm) for structure 2, respectively.

As explained above, the group velocity, $v_g$, of surface plasmon-polariton (SPP) modes, which is given by the slope of the tangent line at a given point on the dispersion curve, decreases significantly as the cutoff frequency is approached. Consequently, if the light at the cutoff frequency is coupled into the grating structure, its $v_g$ becomes quite low. It is a challenge to overcome the large momentum mismatch in the first Brillouin zone and to directly couple the light into one of the SPP modes around the cutoff frequency.

The graded grating structure shown in FIG. 1 and the inset of FIG. 6 is structured to gradually couple light into SPP modes possessing a very low $v_g$. This gradual coupling addresses the aforementioned issues of optical coupling and momentum mismatch. Assuming that the grade is small enough, a graded grating could be approximated by a series of many small gratings, each with a constant groove depth. The dispersion relations for such a nonuniform grating are expected to change gradually along the x axis as the groove depth increases. If a wave propagates along the surface of such a grating, the $v_g$ of the SPP mode gradually decreases along the propagation direction. By properly choosing the grating depths, the $v_g$ for an incoming wave can be greatly reduced and it can even approach zero at a specific location. For example, assume that the groove depth changes gradually from 140 to 230 nm over a 25 µm grating length. For this structure, the dispersion relations will vary as a function of position along the grating, roughly changing from the dispersion curve shown for 140 nm in FIG. 6 to that for 230 nm shown in FIG. 6. At the input port, which is at the shallow end of the grating, only a relatively small momentum mismatch must be overcome to couple the light into the SPP mode. Subsequently, this mode will couple, step by step, as it enters into regions of increasing grating depth. This series of steps is introduced to help overcome the large momentum mismatch between the free space light and the SPP modes and gradually couple light into SPP modes with a large value of $k_x$ and a very small $v_g$. It should also be noted that as the grating depth changes, so does the cutoff frequency. Therefore, incoming waves at different frequencies will be "trapped" at correspondingly different positions having different depths, corresponding, respectively, to different cutoff frequencies, along the grating, leading to the above-described "trapped rainbow" storage of light.

The concept described above was validated by two-dimensional FDTD simulations. For purposes of the simulation, the depth of the grating structure changed from 20 nm to 270 nm linearly in a 25 µm region. The period p and width d of the grating structure are 400 nm and 200 nm, respectively. Non-uniform mesh sizes for the FDTD simulation are employed in this modeling. The edge grid sizes are $\Delta x$=10 nm and $\Delta z$=20 nm. The simulation time T=2000 µm/c, where c is the light velocity in vacuum.

Figure 7:
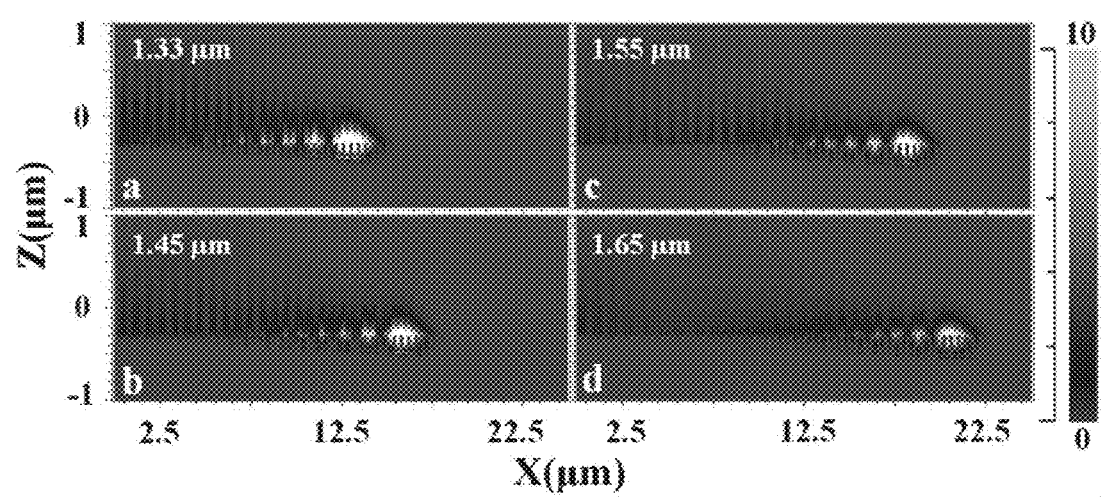
FIG. 7 shows the trapped rainbow for telecommunication wavelengths obtained using two-dimensional FDTD simulations.

FIG. 7 illustrates how light waves at four different wavelengths in the telecommunication domain, i.e., 1.33 µm, 1.45 µm, 1.55 µm, and 1.65 µm, are trapped at different positions along the graded grating structure. These four wavelengths correspond to the cutoff frequencies associated with the grating depths at these positions. According to FIG. 6, the cutoff frequencies for the gratings with constant depths of 140 and 230 nm are about 226.6 THz (i.e., $\lambda\approx1.32$ µm) and 178.1 THz ($\lambda\approx1.68$ µm), respectively. These values are in good agreement with those obtained from the FDTD in FIG. 7. As shown in section (a) of FIG. 7, the 1.33 µm wave is trapped at x=13 µm, where the grating depth is about 150 nm. Similarly, section (d) of FIG. 7 shows how the 1.65 µm wave is trapped at about x=20.5 µm, where the grating depth is about 225 nm.

Figure 8:
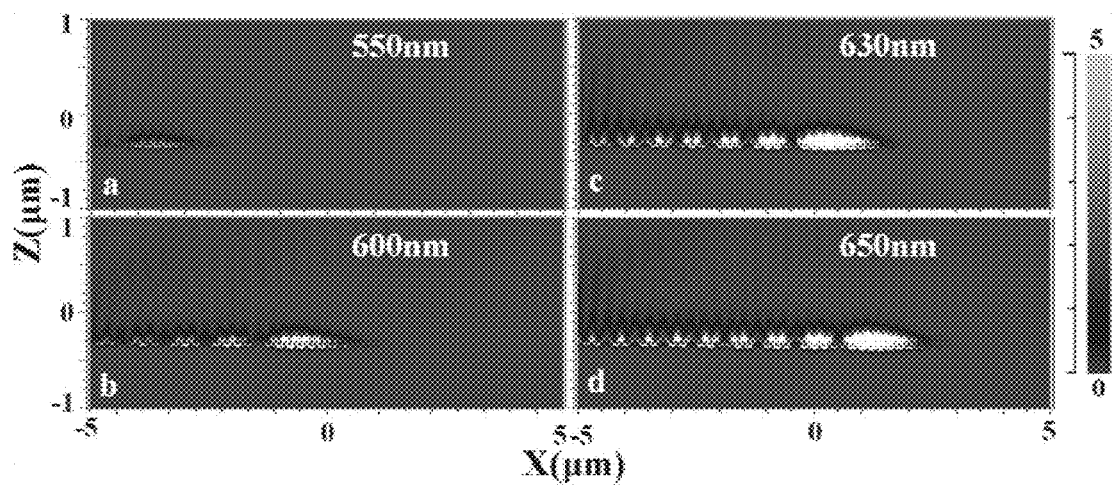
FIG. 8 shows the trapped rainbow for visible wavelengths obtained using two-dimensional FDTD simulations.

By further reducing the feature size of the graded gratings (e.g., period, width and depth), waves in the visible domain (i.e., wavelengths from about 380 to 750 nm; frequency band in the vicinity of 790-400 terahertz) could be "trapped". FDTD simulations confirmed this hypothesis. FIG. 8 illustrates a trapped rainbow for visible wavelengths obtained by using two dimensional FDTD simulations. Sections (a)-(d) of FIG. 8 correspond to the 2D field distribution at four different wavelengths, namely 550 nm, 600 nm, 630 nm and 650 nm. The depth of the grating structure changed from 20 nm to 98 nm linearly in a 10 µm region. In these simulations, the period and width of the grating structure are 200 and 100 nm, respectively. The mesh sizes are $\Delta x$=10 nm and $\Delta z$=2 nm. The simulation time was set to T=1000 µm/c, where c is the light velocity in vacuum.

Figure 13:
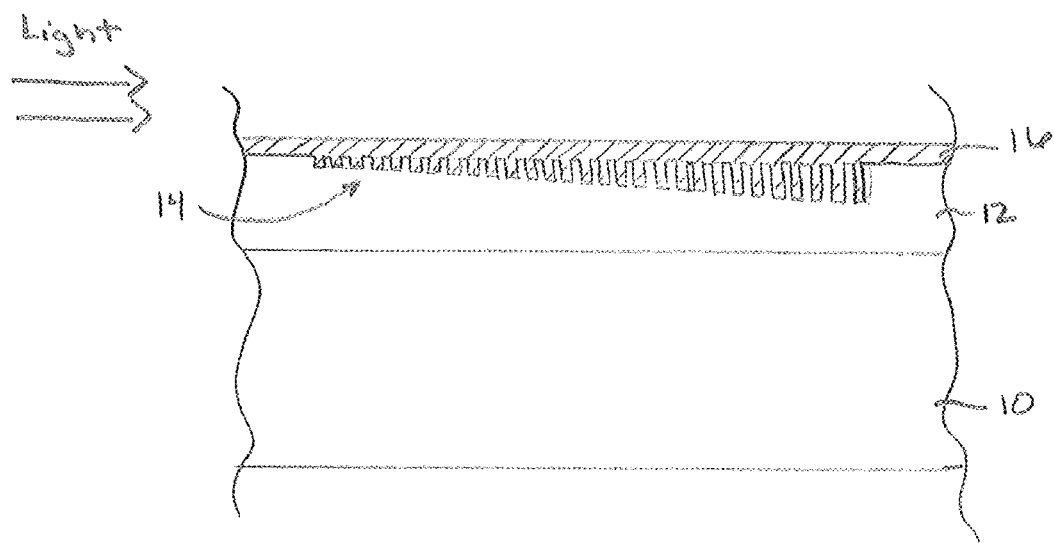
FIG. 13 shows a portion of an integrated circuit chip having a graded grating structure formed over a substrate.

FIG. 13 is a side view of an integrated circuit chip having a graded grating structure formed thereover. The chip includes a substrate 10, such as a silicon, SOI, Si—Ge, or other semiconductor substrate. Of course, if the graded grating structure is not formed in an integrated circuit chip, the substrate need not be a semiconductor substrate. A metal layer 12, such as silver, is formed over the substrate 10 and includes a graded grating structure 14 as described above. A dielectric layer 16 having a temperature-tunable thermo-optic coefficient is disposed over the metal layer 12 and fills the trenches between the gratings of the graded grating structure 14. The trapping and releasing of light using this structure is discussed below.

One question that arises after trapping the telecommunication rainbow at different locations along the graded grating is how to release the trapped waves. In one embodiment, a method for releasing these waves is to cap the metal grating with a dielectric material and temperature-tune the refractive index of the material filling the grooves via the thermo-optic effect. The temperature tuning source may be internal (e.g., resistive heating) or external to the IC. In this way, the optical properties of the plasmonic structure can be tuned by changing the refractive index of the material at the interface. For a given temperature change, the thermo-optic effect would produce a much larger change in the dispersion relations than the thermal expansion or contraction of metals. The thermal expansion coefficient of silver is, for example, about $18.9\times10^{-6}$ K$^{-1}$. In contrast, the thermo-optic coefficient, do/dT, of GaAs is about $(2.0$ to $3.0)\times10^{-4}$ K$^{-1}$, while its thermal expansion coefficient is only about $5.7\times10^{-6}$ K$^{-1}$. Consequently, a temperature change of 100 K will increase the refractive index of GaS by about 0.02 to 0.03 (about 0.6% of the refractive index of 3.37 for GaAs at a wavelength of 1.55 µm). The corresponding change in feature size is only 0.057% and has a negligible effect on the optical properties of the grating structure. In embodiments, the thermo-optic coefficient of dielectric material is at least 10, and preferably at least 50, and more preferably at least 100, times greater than a thermal expansion coefficient of the underlying metal layer in which the grating is formed.

Figure 9:
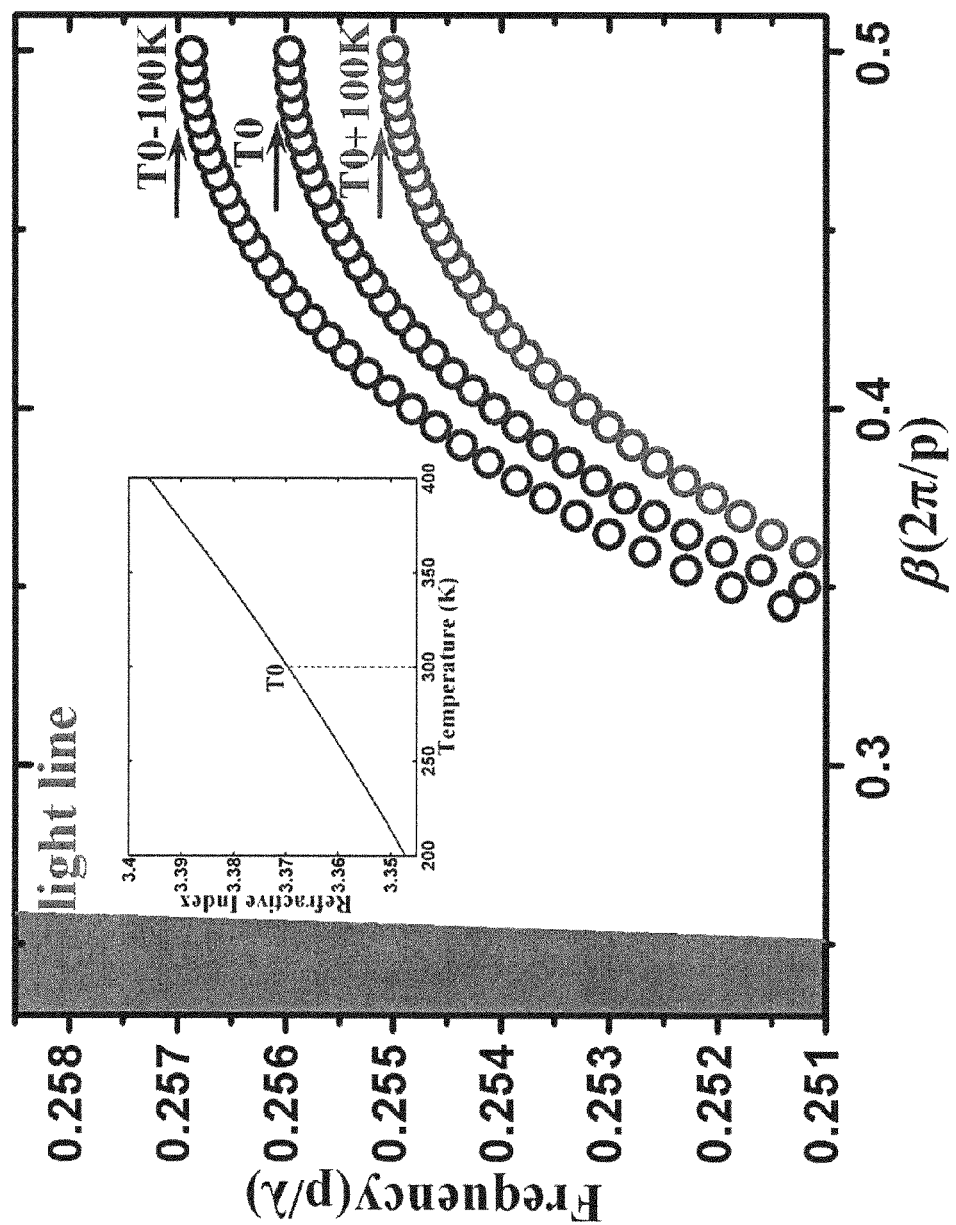
FIG. 9 shows the dispersion curves for a metal grating structure at different temperatures, with an inset showing the temperature dependence of the refractive index of GaAs at a 1.55 µm wavelength.

FIG. 9 shows the dispersion curves calculated for a grating structure having d=200 nm, p=400 nm and h=70 nm at different temperatures. The inset to FIG. 9 shows the temperature dependence of the refractive index of GaAs around 1.55 µm wavelength. The thermo-optical coefficient of GaAs is calculated with the fitting equation: $dn/dT=n(b_0+b_1T+b_2T^2+b_3T^3+b_4T^4+b_5T^5+b_6T^6)$, where "b" is a numerical parameter for this fitting equation, "T" is temperature and "n" is the refractive index. For GaAs at 1.53 μm wavelength, $b_0=-3.059\times10^{-5}$, $b_1=12.03\times10^{-7}$, $b_2=-6.442\times10^{-9}$, $b_3=1.820\times10^{-11}$, $b_4=-2.720\ 10^{-14}$, $b_5=2.047\times10^{-17}$, and $b_6=-6.086\times10^{-21}$ This equation is valid from 85 to 920 K.

At 200 K, $n_{GaAs}$ is approximately 3.347 and the cutoff frequency for the grating structure (h=70 nm, d=200 nm, p=400 nm) is about $1.927\times10^{14}$ Hz (λ=1.557 μm) (See FIG. 9). Surface modes at this frequency are trapped in the structure. If the temperature is increased by 100 K, $n_{GaAs}$ increases to 3.370. Assuming other grating parameters are unchanged, due to the small thermal expansion coefficient, the cutoff frequency would shift to $1.920\times10^{14}$ Hz (λ=1.563 μm). In other words, the trapped surface mode at $1.927\times10^{14}$ Hz is no longer supported by the grating, and therefore released at this temperature. Similarly, if the temperature is further increased to 400 K, $n_{GaAs}$ increases to 3.396, and the cutoff frequency shifts to $1.913\ 10^{14}$ Hz (λ=1.569 μm). As a result, the trapped surface mode at $1.920\times10^{14}$ Hz is also "released." In this way, the trapped waves can be released one by one by temperature-tuning the refractive index of the materials that fill the grating grooves, representing a way to realize the optical buffers for on-a-chip optical communications. Employing materials such as InAs, PbS, and PbSe, which exhibit a larger thermo-optic effect than GaAs, wide temperature tunability can be achieved through an optimized design that incorporates the actual temperature dependence of these materials. Such a thermo-optical coupling mechanism makes possible active control of the speed of surface waves. However, thermal releasing is a relatively slow process. High speed modulation approaches would be used to adapt such structures for optical communication applications.

The discussion above shows that waves at near-infrared and visible wavelengths can be slowed down in the graded grating structures. According to the perfect electronic conductor (PEC) model commonly employed for terahertz waves, loss may be neglected, and the $v_g$ at the cutoff frequency could be very close to zero. However, at telecommunication and visible wavelengths, the strong metal absorption cannot be neglected, and $v_g$, i.e., the slope of the dispersion curve at the band edge, is not so close to zero. Consequently, when absorption loss is considered, the plasmonic modes cannot be "stopped" completely. However, their group velocity can be significantly reduced. At the band edge shown in FIG. 6, the $v_g$ of the SPP could be slowed down by about a factor of $10^3$ to $10^4$, which is appropriate for implementing practical slow-light applications. Reflection and scattering are both possible loss mechanisms after the surface modes are guided to their corresponding trapped positions.

The lifetime of the plasmonic modes in the grating structures should be examined when considering their usefulness for practical applications. The lifetime of the SPP in these structures was not directly calculated, but it can be estimated indirectly from the FDTD simulations, using the expression, $\tau=1/(\alpha v_g)$, where α is the propagation loss coefficient. The $v_g$, which is obtained from the slope of the dispersion curve, decreases significantly as the frequency increases towards the cutoff frequency of the metal grating. The propagation loss coefficient α, which depends on both internal absorption and scattering losses, can be determined from the two-dimensional field distribution obtained from FDTD simulations. A large α, which may be expected due to strong metal absorption in the near-infrared and visible spectral regions, would be indicative of a shorter photon lifetime.

FIG. 10A illustrates lifetimes of the SPP modes for an incident wavelength of 1.70 μm calculated using Eq. (10) (below). The inset of FIG. 10A shows the dispersion curve for a flat silver/air interface calculated using Eqs. (6) and (7) (below) (solid line in inset) and the FDTD method (dotted line in inset). FIG. 10B shows an estimate of the SPP lifetime, τ, at the wavelength of 1.70 μm along the grating surfaces for various depths. The dotted data points represent extracted raw data. The dashed line is an exponential growth fit to guide the eyes.

The incoming wave of fixed frequency coupling into SPPs on a flat metal/dielectric interface is first considered. When the permittivity of the dielectric layer is increased, the cutoff frequency of the dispersion curve decreases. As the SPP cutoff frequency decreases and becomes closer to the frequency of the light wave, the wave is confined more strongly at the interface. This results in an increase in the energy confined at the interface and penetrating into the metal. Consequently, larger metal absorption and shorter SPP lifetime is expected, as illustrated in FIG. 10A. A more detailed discussion of the lifetime of SPP modes on nano structure surfaces is provided below in the section entitled "Lifetime of SPP Modes on Nano Structured Surfaces."

One option is the formation of SPPs on grating surfaces with a metal/air interface in the visible and near-IR spectral regions. The lifetime of the plasmonic mode can be estimated by extracting approximate values of $v_g$ and α from the FDTD simulations (See discussion of FIG. 11 below). FIG. 10B shows that the empirically derived surface plasmon lifetime as a function of groove depth, for a wavelength of 1.70 μm, is quite different from the behavior obtained for flat metal/dielectric interfaces shown in FIG. 10A. As the SPP is guided along the graded grating surface in the direction of increasing groove depth, its lifetime increases monotonically with groove depth, reaching a value of approximately 3 ps where the groove depth is 240 nm. Such a lifetime should be long enough for some meaningful nano-photonic applications. The capability of significantly reducing the $v_g$ of light along the graded grating structures and trapping photons for a long period of time should find applications in compact optical-buffer memories, quantum-information/optical processing, data synchronizers, broadband slow-light systems, integrated optical filters, wavelength-division multiplexing, on-chip optical interconnectors, spectroscopy, imaging devices, nonlinear optical devices, and plasmonic active devices. The graded grating structure disclosed herein should also find application in formation of heterojunctions for use in novel solar cell designs.

Lifetime of SPP Modes on Nano Structured Surfaces

Historically, consideration of the lifetime of SPP modes on the nano structured surfaces has received little attention. As discussed below, the lifetime of the SPP modes on the metal grating structures was investigated and compared with the lifetime of the modes on flat metal surfaces. It was discovered that the lifetime properties of these two modes are quite different.

A. Lifetime on Flat Metal/Dielectric Interfaces

Dispersive properties of flat metal/dielectric interfaces and corresponding SPP photon lifetime have been studied in the past. Here, a traditional procedure is introduced to analyze the photon lifetime at the flat metal/dielectric interface. The wave vector along the surface direction, $k_x$, can be described as:

$$k_x = \frac{\omega}{c}\left(\frac{\varepsilon_1\varepsilon_2}{\varepsilon_1+\varepsilon_2}\right)^{1/2}. \quad \text{(Eq. 5)}$$

Considering the permittivity of metal, $\epsilon_1 = \epsilon_1' + i\epsilon_1''$, and assuming $\epsilon_1'' \ll |\epsilon_1'|$, then a complex $k_x = k_x' + k_x''$ is obtained with $$k_x' = \frac{\omega}{c}\left(\frac{\varepsilon_1'\varepsilon_2}{\varepsilon_1' + \varepsilon_2}\right)^{1/2} \quad \text{(Eqs. 6, 7)}$$

and $$k_x'' = \frac{\omega}{c}\left(\frac{\varepsilon_1'\varepsilon_2}{\varepsilon_1' + \varepsilon_2}\right)^{3/2} \frac{\varepsilon_1''}{2(\varepsilon_1')^2}.$$

Here, $k_x'$ indicates the dispersion curve of the SPP modes on flat metal/dielectric interfaces; and $k_x''$ determines the internal absorption in x direction. Actually, the value of $k_x''$ is the propagation loss, $\alpha$, on flat metal surfaces. Consequently, the photon lifetime of the surface waves at flat interfaces can be calculated as follows:

$$v_g = d\omega/dk_x' = c\sqrt{\frac{\varepsilon_1' + \varepsilon_2}{\varepsilon_1'\varepsilon_2}} \quad \text{(Eqs. 8, 9)}$$

and $$\alpha = \sqrt{\frac{\varepsilon_1'\varepsilon_2}{\varepsilon_1' + \varepsilon_2}} \frac{\varepsilon_1''\varepsilon_2}{2\varepsilon_1'(\varepsilon_1' + \varepsilon_2)}\frac{\omega}{c}.$$

Consequently, $$\tau = \frac{1}{\alpha v_g} = \frac{2\varepsilon_1'(\varepsilon_1' + \varepsilon_2)}{\varepsilon_1''\varepsilon_2}\frac{1}{\omega}. \quad \text{(Eq. 10)}$$

Now, Eqs. 8-10 can be employed to examine the lifetimes of SPP modes on flat metal/dielectric interfaces. As shown in the inset of FIG. 10A, dispersion curves of a flat silver surface are calculated using Eqs. 6 and 7 (solid line in inset) and the finite-difference-time-domain (FDTD) method (dotted data points in inset). One can see that the two curves fit well below the frequency of 1.5 $\mu m^{-1}$. If the incident frequency is chosen at 0.5917 $\mu m^{-1}$ (wavelength of 1.69 $\mu m$, $\epsilon_1'' \sim 10.484 \ll |\epsilon_1'| \sim 101.741$) as an example, the values of $v_g$, $\alpha$ and $\tau$ for the surface modes at a silver/air interface can be calculated based on optical constants for silver and Eqs. 8-10. (See FIG. 10A). It can be seen from Eqs. 6-7 that when the permittivity of the dielectric layer increases the cutoff frequency of the dispersion curve will decrease. When the incoming frequency is close to the cutoff frequency of the metal/dielectric interface, more energy will be confined at the interface and forced to penetrate into the metal, which will lead to larger metal absorption and shorter lifetime of the SPP modes at the flat metal/dielectric interfaces.

B. Estimation of the Plasmonic Mode Lifetime at Metal Grating Surfaces with Constant Groove Depths (1) Estimation of the Group Velocity, vg It is known that the group velocity of the SPP modes is given by the slope of the tangent line at a given point on the dispersion curve. Based on the dispersion curves similar to those shown in FIG. 6, $v_g$ at various frequencies can be extracted, as shown in the table below.

| Wavelength in vacuum λ (μm) | Depth in modeling (nm) | 1/α (μm) | $v_g$ | τ (ps) |
|---|---|---|---|---|
| 1.70 | 210 | 11.86563 ± 1.80108 | c/23.8650 | 0.9439 ± 0.1433 |
| | 215 | 10.6594 ± 0.89529 | c/27.9850 | 0.9943 ± 0.0835 |
| | 220 | 9.77657 ± 0.284 | c/33.0764 | 1.0779 ± 0.0313 |
| | 225 | 9.20255 ± 0.48799 | c/39.9970 | 1.2269 ± 0.0651 |
| | 230 | 8.00922 ± 0.19671 | c/54.8558 | 1.4645 ± 0.0360 |
| | 235 | 7.57091 ± 0.38337 | c/64.56212 | 1.6293 ± 0.0825 |
| | 240 | 6.346 ± 0.07181 | c/135.47187 | 2.8657 ± 0.0324 |

The Table shows an estimation of the lifetime of the plasmonic modes on the grating surfaces for different depths. In this modeling, the simulation time is set to be 2000 μm/c, where c is the light velocity in vacuum.

(2) Estimation of the Propagation Decay Coefficient, α

Figure 11:
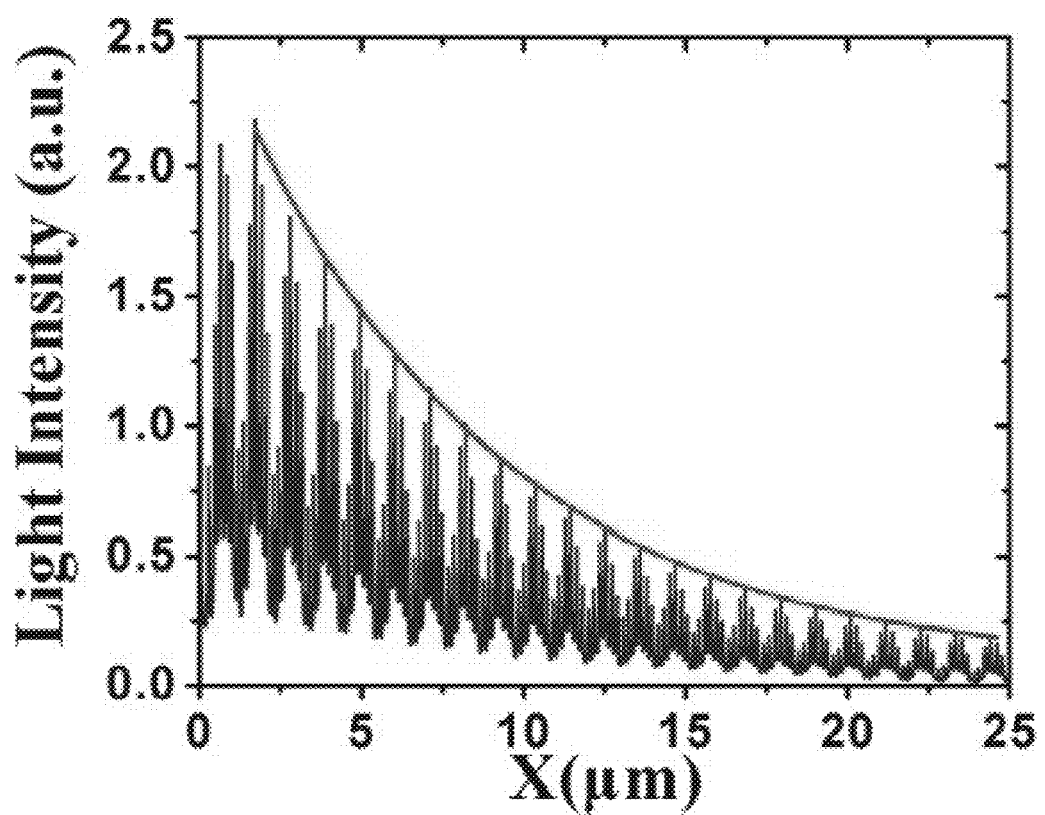
FIG. 11 shows an estimation of the propagation loss at a given wavelength along a grating surface with a constant grating depth.
Figure 12:
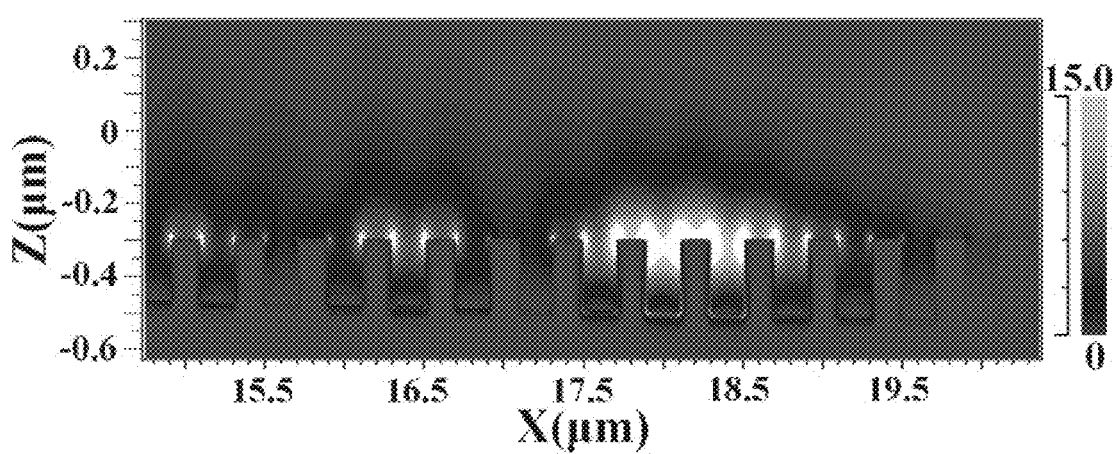
FIG. 12 is a zoom in field distribution of section (c) of FIG. 7.

When the surface mode is guided along the metallic grating surface, the intensity of the mode decreases due to metal absorption and surface scattering. The propagation decay coefficient can be extracted from the FDTD simulation results. As an example, the wavelength of the excitation light source is set to be 1.7 μm. The $|E|^2$ intensity distribution is determined at 10 nm above the grating surface, as shown in FIG. 11. FIG. 11 shows the estimation of the propagation loss, α, at the wavelength of 1.70 μm along the grating surface with a constant depth of 230 nm. The propagation decay coefficient can be extracted from the intensity distribution along the grating surface. To ensure that the simulation time is sufficiently long in this modeling, it was set at 2000 μm/c, where c is the light velocity in vacuum. It can be seen that the peak intensities of the modes decrease along the surface. By fitting the peaks of the modes, the propagation decay coefficient, α, can be extracted. For a constant depth of 230 nm, α is found to be approximately 0.1249 $\mu m^{-1}$. It should be noted that for plasmonic modes confined and guided along the metal grating surfaces, the energy can be highly confined to the gaps between the metal grooves rather than penetrated into the metal, as shown in FIG. 12, which shows a zoom-in field distribution for section (c) of FIG. 8. At the "stopped" position, most of the energy of the surface modes is confined in the gaps between the metal grooves rather than penetrating into the metal. Therefore, the metal absorption loss should be smaller than that for a flat metal/dielectric interface where there is significant penetration into the metal and therefore absorption by the metal.

The extracted α for a surface mode propagating along the grating surfaces is listed in the Table above for various groove depths. As illustrated by the data in the Table, the loss coefficient α increases mildly with increasing groove depth, i.e., by less than a factor of two. Meanwhile, the group velocity, $v_g$, decreases by more than a factor of five over the same range of groove depths. Accordingly, the lifetime increases by slightly over a factor of three as the grating depth increases from 210 nm to 240 nm as shown in FIG. 10B. The lifetime of the SPP mode increases as the frequency of the incoming light approaches the cutoff frequency of the grating structure, which is quite different from the behavior obtained for the SPP lifetime on flat metal/dielectric interfaces, as obtained by Eq. 10 and shown in FIG. 10A.

While the discussion of the grating structure disclosed herein has been in connection with a silver grating structure, other materials such as gold, aluminum or even doped semiconductor materials may be used.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. A slow light system, the system comprising a substrate and a metal layer formed thereon, the metal layer having a graded grating structure formed at a surface thereof, wherein the grating depth of the grating structure is sized such that surface-plasmon polariton dispersion behavior of the grating structure differs at different respective locations along the grating structure, whereby different wavelengths of incident light waves are slowed at the respective locations along the grating structure.

2. The slow light system of claim 1, wherein the grating structure is periodic and the grating depth increases gradually along the grating structure.

3. The slow light system of claim 1, wherein the grating structure has gratings sized for operation with light waves having component frequencies between about 0.6 to 1.4 THz.

4. The slow light system of claim 3, wherein the grating depth of the grating structure ranges from about 50 μm to about 110 μm.

5. The slow light system of claim 1, wherein the grating structure has gratings sized for operation with light waves having component frequencies between about $1.78 \times 10^{14}$ to $2.27 \times 10^{14}$ Hz.

6. The slow light system of claim 5, wherein the grating depth of the grating structure range from about 140 nm to about 230 nm.

7. The slow light system of claim 1, wherein the grating structure has gratings sized for operation with light waves in the visible spectrum.

8. The slow light system of claim 1, wherein the grating structure has gratings sized for operation with light waves in the infrared spectrum.

9. The slow light system of claim 1, further comprising a layer of dielectric material deposited over the grating structure and between adjacent gratings of the grating structure.

10. The slow light system of claim 9, wherein the dielectric material has a thermo-optic coefficient of the dielectric that is substantially greater than a thermal expansion coefficient of the metal layer.

11. The slow light system of claim 10, wherein the thermo-optic coefficient is at least 50 times greater than the thermal expansion coefficient.

12. The slow light system of claim 9, wherein the dielectric material is selected from the group consisting of GaAs, InAs, PbS, and PbSe.

13. The slow light system of claim 1, wherein the grade of the graded grating structure is less than or equal to about 1/80.

14. The slow light system of claim 1, wherein the metal layer comprises silver, gold, aluminum or a doped semiconductor material.

15. A slow light system comprising a substrate and a layer formed thereon, the layer having a graded grating structure comprising a plurality of parallel grooves formed at a surface thereof, wherein the grating depth of the grating structure is sized such that surface-plasmon polariton (SPP) dispersion behavior of the grating structure differs at different respective locations along the grating structure, wherein the grating depth increases gradually along the grating structure to reduce scatter loss and reflection loss when a SPP mode propagates from groove to groove, whereby different wavelengths of incident light waves are slowed at the respective locations along the grating structure.

16. A method of slowing and releasing light in a slow light system, comprising the steps of:
    coupling incident light comprising light waves of different wavelengths to a slow light system, the slow light system comprising a substrate and a metal layer formed thereon, the metal layer having a graded grating structure formed at a surface thereof, wherein the grating depth of the grating structure is sized such that surface-plasmon polariton dispersion behavior of the grating structure differs at different respective locations along the grating structure, wherein different wavelengths of incident light waves are slowed at the respective locations along the grating structure, the slow light system having a layer of dielectric material deposited over the grating structure and between adjacent gratings of the grating structure; and
    adjusting a temperature of the slow light system to release the slowed surface plasmon polaritons from the grating structure.

17. The method of claim 16, where the adjusting step includes the step of adjusting the temperature to sequentially release slowed surface plasmon polaritons corresponding to light waves of different wavelength from the grating structure.

18. The method of claim 16, wherein the dielectric material is selected from the group consisting of GaAs, InAs, PbS, and PbSe.

19. The method of claim 16, wherein the grating structure is periodic and the grating depth increases gradually along the grating structure.

20. The method of claim 16, wherein the dielectric material has a thermo-optic coefficient that is substantially greater than a thermal expansion coefficient of the metal layer.

* * * * *